US011386227B1

(12) United States Patent
Harstad (10) Patent No.: US 11,386,227 B1
(45) Date of Patent: Jul. 12, 2022

(54) PROTECTION OF DATABASES, DATA TRANSMISSIONS AND FILES WITHOUT THE USE OF ENCRYPTION

(71) Applicant: CyberAdjust, LLC, Columbia, MO (US)

(72) Inventor: Ronald M Harstad, San Diego, CA (US)

(73) Assignee: CyberAdjust, LLC, Columbia, MO (US)

(*) Notice: Subject to any disclaimer, the term of this patent is extended or adjusted under 35 U.S.C. 154(b) by 0 days.

(21) Appl. No.: 17/345,895

(22) Filed: Jun. 11, 2021

Related U.S. Application Data (60) Provisional application No. 63/153,352, filed on Feb. 24, 2021.

(51) Int. Cl.
*G06F 21/62* (2013.01)
*G06F 16/22* (2019.01)
*G06F 7/72* (2006.01)

(52) U.S. Cl.
CPC ............ *G06F 21/6245* (2013.01); *G06F 7/72* (2013.01); *G06F 16/221* (2019.01); *G06F 7/721* (2013.01)

(58) Field of Classification Search
CPC ...... G06F 21/6245; G06F 7/72; G06F 16/221; G06F 7/721
USPC .......................................................... 726/26
See application file for complete search history.

(56) References Cited

U.S. PATENT DOCUMENTS

| | | | |
|---|---|---|---|
| 6,691,132 B2* | 2/2004 | Walker | G06F 16/284 707/999.102 |
| 7,836,508 B2* | 11/2010 | Gumpel | G06F 21/6245 380/252 |
| 8,122,190 B1* | 2/2012 | Doi | G06F 7/76 711/170 |
| 8,504,845 B2* | 8/2013 | Farrugia | G06F 21/602 713/189 |
| 9,189,425 B2* | 11/2015 | Farrugia | H04L 9/0631 |
| 9,514,169 B2* | 12/2016 | Mattsson | G06F 21/6227 |
| 9,720,943 B2* | 8/2017 | Mattsson | G06F 21/6227 |
| 9,773,125 B2* | 9/2017 | Mattsson | G06F 21/6254 |
| 9,785,786 B2* | 10/2017 | Mattsson | G06F 21/6227 |
| 9,984,245 B2* | 5/2018 | Schmitt | H04L 67/10 |
| 10,872,487 B2 | 12/2020 | Komo et al. | |
| 10,917,413 B2* | 2/2021 | Kurian | H04L 63/0209 |

(Continued)

*Primary Examiner* — Sheree N Brown
(74) *Attorney, Agent, or Firm* — Brill Law Office; Jeffrey Brill (57) ABSTRACT

A permutation algorithm using modular arithmetic is applied to the cells of one or more specific fields of a database or other file type. This permutation reorders the cells of the specific field(s) without altering content of any individual cell, thereby hiding relationships between cells of the permuted field(s) and the other information in the associated records. The permutation algorithm may use modular addition and modular subtraction, in either order. Different permutation algorithms may use varying numbers of parameters. To locate a specific cell in a permuted field, the parameter(s) from the permutation, an identification of the specific record associated with the cell, and an identification of the specific permuted field are applied in a modular arithmetic operation. A specific record with which a specific cell in a permuted field is associated may be obtained by an inverse modular arithmetic operation.

4 Claims, 4 Drawing Sheets

(56) References Cited

U.S. PATENT DOCUMENTS

| | | | | |
|---|---|---|---|---|
| 2002/0178171 | A1* | 11/2002 | Walker | G06F 16/284 |
| | | | | 707/999.102 |
| 2007/0110224 | A1* | 5/2007 | Gumpel | G06F 21/6245 |
| | | | | 380/28 |
| 2009/0132575 | A1* | 5/2009 | Kroeschel | G06F 21/6254 |
| | | | | 707/E17.037 |
| 2012/0254625 | A1* | 10/2012 | Farrugia | G06F 21/52 |
| | | | | 713/189 |
| 2013/0061061 | A1* | 3/2013 | Farrugia | G09C 1/00 |
| | | | | 713/190 |
| 2015/0235045 | A1* | 8/2015 | Schmitt | H04L 67/306 |
| | | | | 707/784 |
| 2016/0085955 | A1* | 3/2016 | Lerner | H04L 9/0869 |
| | | | | 726/20 |
| 2016/0210470 | A1* | 7/2016 | Rozenberg | G06F 16/284 |
| 2017/0078321 | A1* | 3/2017 | Maylor | H04L 63/105 |
| 2017/0180378 | A1* | 6/2017 | Tyler | H04L 63/1433 |
| 2017/0195310 | A1* | 7/2017 | Tyler | H04L 63/083 |
| 2017/0250979 | A1* | 8/2017 | Benson | H04L 63/08 |
| 2017/0366356 | A1* | 12/2017 | Ramos | H04L 9/0861 |
| 2018/0035285 | A1* | 2/2018 | Ferrara | H04W 12/08 |
| 2020/0137110 | A1* | 4/2020 | Tyler | H04L 63/1483 |
| 2020/0358798 | A1* | 11/2020 | Maylor | H04L 63/1425 |

* cited by examiner

PROTECTION OF DATABASES, DATA TRANSMISSIONS AND FILES WITHOUT THE USE OF ENCRYPTION

CROSS-REFERENCE TO RELATED APPLICATIONS

The present application claims the benefit under 35 U.S.C. § 119(e) of U.S. Provisional Patent Application Ser. No. 63/153,352, entitled "Protection of Databases, Data Transmissions and Files without Encryption," filed on Feb. 24, 2021, the entire contents of which are incorporated herein by reference.

TECHNICAL FIELD

This disclosure pertains generally to computer data security, and more specifically to the protection of databases and other types of computer files by permuting fields within columns or rows using modular arithmetic, without encrypting the content or otherwise altering any individual datum in a database.

BACKGROUND

Protecting computer data from access by malicious parties such as hackers is of paramount importance. More and more of the world's data is being stored online, for example in the databases of companies, governments, universities, and other organizations, as well as in business and personal accounts on various cloud-based storage services. Despite the encryption of the data and the use of other conventional security protocols of varying degrees of effectiveness such as firewalls and dual authentication, data stored online is frequently successfully hacked. Private and often highly sensitive government, corporate and personal information is frequently accessed, stolen, sold and/or used illicitly for nefarious purposes such as espionage, ransomware, blackmail, financial fraud, and other criminal activities.

Data stored online is typically protected by encryption. Encryption is a process of encoding information. Encryption converts the original data, called plaintext, into an unintelligible form, called ciphertext. Encryption is typically based on the use of a pseudo-random encryption key to encrypt plaintext into ciphertext. The ciphertext can be decrypted back to plain-text with the use a decryption key provided to authorized parties. There are many different encryption techniques. Contemporary encryption typically utilizes public-key (asymmetric) or symmetric-key methodologies.

Various techniques are used by hackers to decrypt ciphertext without possessing the decryption key. These techniques typically require considerable computing power, but powerful computational resources are readily available and not prohibitively expensive, even at the levels required to crack contemporary commercial-grade encryption. Hackers and computer security professionals are constantly engaged in a game of "cat and mouse," with the hackers trying to stay one step ahead of the security professionals, and the security professionals trying to "up their game" to catch-up with, or hopefully get ahead of, the hackers.

One characteristic of encryption is that when ciphertext is successfully decrypted, the accomplishment is immediately obvious. Ciphertext appears as gibberish, whereas plaintext is clearly readable. When hackers attempt to decrypt ciphertext, it is immediately clear to them when they have succeeded.

It would be desirable to address these issues.

SUMMARY

Sensitive content such as personal or financial information in a database or other type of file is secured from unauthorized access by hiding relationships between the sensitive content and other associated data. For example, in the case of a database the relationships between fields containing information to be protected and their associated database records is hidden. To do so, a permutation algorithm using modular arithmetic is applied to the cells of one or more specific fields of the database. This permutation reorders the cells of the specific field(s) without altering content of any individual cell. A permuted field still contains all of the original cells, but in a permuted order, thereby hiding relationships between cells of the permuted field(s) and the other information in the associated records. Typically, a database stores fields in columns and records in rows, in which case permuting cells of a specific field of the database takes the form of applying the permutation algorithm to the cells of the column that contains the field. In an implementation in which the database stores fields in rows and records in columns, permuting a field takes the form of permuting a corresponding row.

The permutation algorithm may be in the form of a bijective function that uses modular arithmetic, for example by using modular addition and modular subtraction, in either order. In different implementations, different permutation algorithms may be applied which use a single parameter or varying numbers of multiple parameters. Using more parameters increases the level of security, generally at the expense of utilizing more computing resources. Different implementations may apply varying trade-offs between security and computing resource utilization in different scenarios, as desired.

A specific cell in a permuted field may be located by applying the one or more parameters used in the application of the permutation algorithm in a modular arithmetic operation. It is to be understood that the specific cell being located is associated with a specific record but not located within the specific record as a result of the permutation. To locate the cell, the one or more parameters, an identification of the specific record with which the specific cell of the permuted field is associated, and an identification of the specific permuted field are applied in the modular arithmetic operation to locate the specific cell in the permuted field.

A specific record with which a specific cell in a permuted field is associated but in which the specific cell is not located may be obtained by an inverse modular arithmetic operation. More specifically, via the one or more parameters used in the application of the permutation algorithm, an identification of the specific record within which the specific cell of the permuted field is located, and an identification of the specific permuted field are applied in a modular arithmetic operation to locate the specific record with which the specific cell in the permuted field is associated.

In some implementations, content in a file of a particular type other than a database is protected from unauthorized access by hiding relationships between units of content of the file. To do so, one or more segment size(s) for the file of the particular type may be determined. The file is then divided into a linear construction of segments of the determined size(s). The linear construction may be treated as a series of rows and columns, with the segments filling cells of the columns of the rows. Different segments that will become cells of different columns may have different sizes. The cells of a specific column or a specific row (or multiple columns or rows) may be permuted by applying the permutation algorithm using modular arithmetic described above to the cells of the specific column or the specific row, wherein the permutation reorders the cells without altering content of any individual cell. The permuted column(s) or the permuted row(s) still contain all of the original cells in a permuted order, thereby hiding relationships between the cells of the permuted column(s) or the permuted row(s) and the other cells of the file.

With the permutation functionality described herein, the protected version of the database (or other type of file) does not alter the contents of any cell in the unprotected ("clear") database. Thus, if a cell records the number of purchases of a product by a particular customer, or someone's date of birth, or a doctor's written prognosis, each of these values is unchanged during protection. By itself, a date of birth cannot be a datum potentially damaging if in a bad actor's hands unless it can be connected with its context: whose date of birth this is. The protection occurs by altering the location of this cell's contents, so that it can no longer be connected with a name or other contextual information. As nothing would be accomplished by moving a date of birth into the "diagnosis" column, altering the location of any given cell's contents occurs within the column. Once protected, a "birth-date" column will still contain only birthdates, a "practitioner" column only practitioner names, a "credit limit" column only credit limits. This altering of locations within columns [a] maintains the number of rows, [b] assigns a cell a specific location (almost always different from its original location), and [c] each destination location is unique (e.g., the contents of {row 4, column 17} and that of {row 27, column 17} cannot both be placed in {row 62, column 17}). These features are satisfied if the movement of cell data within a column is a permutation: a reordering of an ordered set. Indeed, any way of moving contents of the cells within a column that satisfies [a], [b] and [c] is a permutation.

Systematically permuting contents of the cells within columns calls for modular arithmetic, which means that the arithmetic is arranged so that no cell_'s contents is moved to a row outside the set of rows of the unprotected database: if there are 10,000 rows, the permutation calls for any Cell's contents to be moved to a row numbered at least 0 (the top row), and at most 9,999 (the bottom row). If the extent of downward or upward movement of a cell's contents is random, the randomization is to be controlled so that [c] above is satisfied.

This approach allows for obtaining the data needed to respond to a query (e.g., "Which of Dr. X's patients have also seen Dr. Y?", or "what is last week's total frozen-food revenue from customers in zip code 90084?") directly from the protected version of the database. Doing so is based on the fact that, in the protected database, the zip code in {row 27, column 17} does not relate to the frozen-food revenue in {row 27, column 43}, but rather to the frozen-food revenue in, e.g., {row 196, column 43} (where 196 was obtained from 27 via the modular arithmetic used to protect the database).

Suppose, though, that protecting a file is desired not because it is a database an organization wants to query frequently yet securely, but rather because it is some type of file to be preserved digitally for possible future use which contains highly sensitive confidential or proprietary information. It may be a confidential contract, a dated file of an image that would allow proof that the owner possessed this image as of a certain date, a recording of a phone call; any type of file that needs to be kept digitally, but protected in a secure manner. The permutation functionality described herein can be utilized to protect any type of file, and will render the protected version of the file more secure than encrypting it would.

Any file, be an image file, a sound file, a text file, or other type can be protected as described herein. The file appears to a computing device as a single row of hexadecimal characters, possibly very long. That row can be divided up into segments, perhaps each four bytes (or another chosen length), and these segments then converted to a rectangular shape, perhaps 1,000 rows each across 2,400 columns, each "cell" in {row R, column C} consisting of, e.g., four bytes. Now using modular arithmetic to permute within columns generates a protected version of the file far more difficult to unprotect. (or even to recognize that it is, say, a phone-call recording) than if protection had been via encryption.

The features and advantages described in this summary and in the following detailed description are not all-inclusive, and particularly, many additional features and advantages may be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various implementations for purposes of illustration only. One skilled in the art will readily recognize from the following discussion that other implementations of the structures and methods illustrated herein may be employed without departing from the principles described herein.

DETAILED DESCRIPTION

Figure 1:
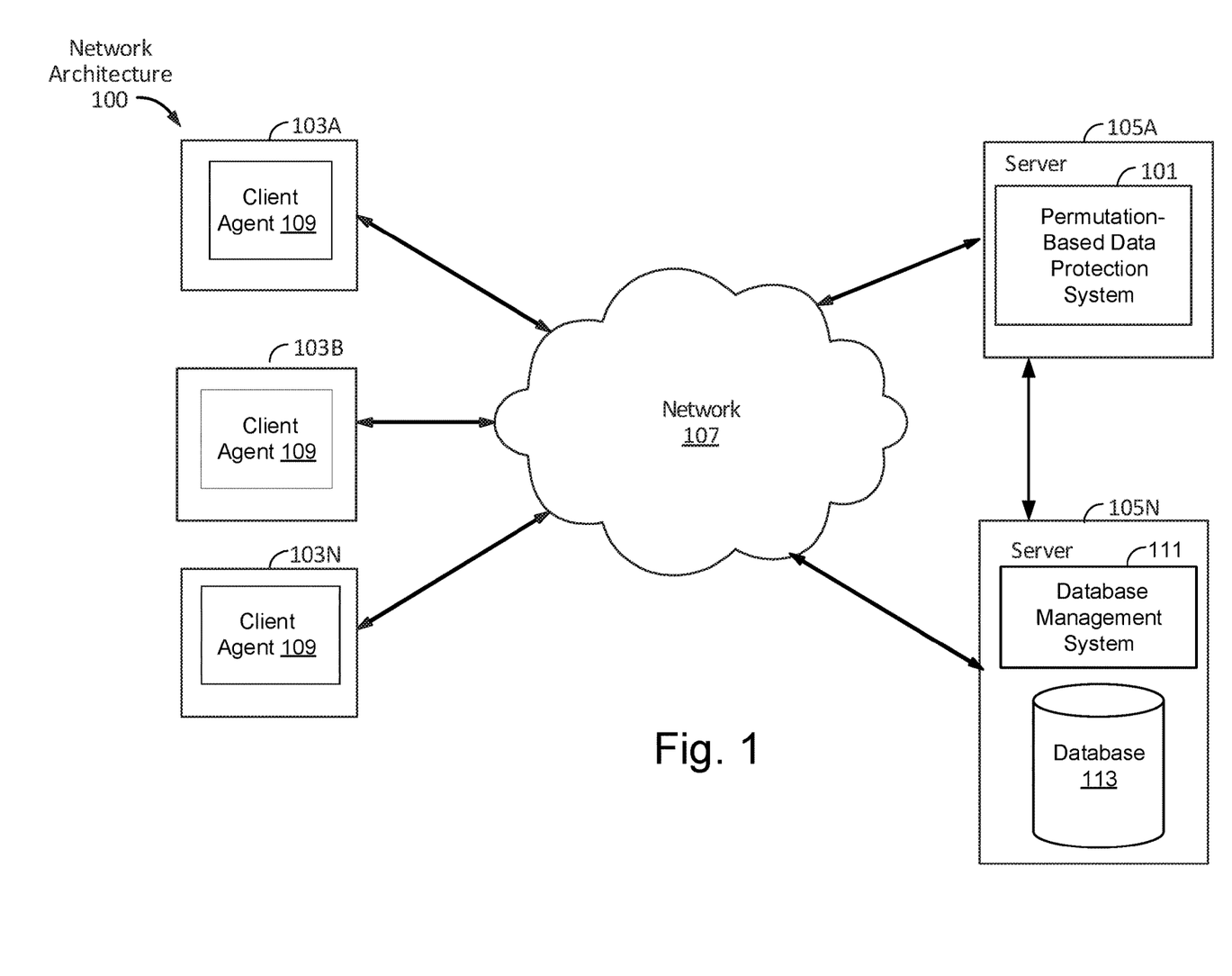
FIG. 1 is a block diagram of an exemplary network architecture in which a permutation-based data protection system can be implemented, according to some implementations.

FIG. 1 is a high-level block diagram illustrating an exemplary network architecture 100 in which a permutation-based data protection system 101 can be implemented. As described in more detail below, the permutation-based data protection system 101 may be utilized to protect databases 113 (and computer files in other formats) without altering any individual datum, and to protect data transmissions by adding extraneous data without altering any of the requested data. An individual datum in a database 113 is typically meaningless by itself, but instead is useful only in context with the other data to which it is connected. Thus, a hacker obtaining individual cells of data from a database 113 could not do any damage. For example, obtaining an individual credit card number without any contextual information would be useless to a hacker. It is the connections between datapoints that are desirable to protect: what is the name of the party associated with that specific credit card number, what is the associated 3-digit code (CVV), what is that person's zip code, billing address, etc.? As another example, the measurements resulting from of a given medical test performed on a particular patient (e.g., a single cell of a database 113) or on a group of patients (e.g., one entire column) would be useless without knowing how the raw measurement data connects to other data, for example when the tests were conducted, for which practitioner, and how the results compare to the most recent measurements for the same patients, etc.

A database 113 typically imposes structure on data by organizing data in tables in which types of data (e.g., names, credit card numbers, addresses, etc.) are stored in columns (sometimes called the fields of the database), and connected data for a given entity (e.g., the name, credit card number, address, etc., for a specific person) are stored in rows (sometimes called records). In other words, a record comprises all of the fields of data for a given entry in the database. Thus, the fact that a given credit card number is associated with a given name, CVV and zip code is only known by accessing the whole record for the given party. Accessing an individual cell in the credit card column (or even the whole column) would not give the hacker knowledge of which credit card is associated with which party, etc. Although storing records as rows and fields as columns is a convention, it is an arbitrary one, and records can be stored in columns and fields in rows. Note further that multiple tables can also be related to each other by common fields. For example, a table containing patient names, addresses and credit card information can be related to a table containing medical history data by a "patient id" field common to both tables.

The permutation-based data protection system 101 prevents hacker damage by protecting the relationships between fields within records by permuting data in one or more fields (e.g., columns) of a database 113 or file, thus hiding the relationships between different fields of data for given records. Thus, for example, measurements are disconnected from patient names, supplier names are disconnected from supplier bank-account information, etc.

A permutation is an ordering of the members of a set. Taking the individual cells in a column of a database as a set, the possible permutations of that set are all the ways in which the content of the columns could be ordered. Using a column with only three rows containing the positive integers 1, 2, and 3 as a (trivial) example for the sake of illustration, the set is {1,2,3} and the possible permutations are (1,2,3), (1,3,2), (2,1,3), (2,3,1), (3,1,2), and (3,2,1). The number of permutations for a set of n members is n factorial (n!). Thus, the number of possible permutations of a set goes up factorially as sets increase in size. The example set of three members has 3! (6) permutations. However, adding just one more member would increase the number of permutations to 4! (24), adding two members to 5! (120), and so on.

Note that permuting the data in the cells of a database does not alter the data, it just reorders it. Thus, the permutation-based data protection system 101 does not alter the data in the cells of a database 113, but instead permutes the data within columns (or rows in the case of a database in which fields are row-based rather than the more typical configuration in which fields are column-based and records are stored in rows). A database 113 that has been secured by the permutation-based data protection system 101 still looks like a database 113. In other words, unencrypted column data still appear in the columns, and unencrypted row data still appear in the rows. Further, every attempt to unpermute, that is to try some perhaps randomly chosen permutations of columns in the hopes of restoring the data to its original unprotected order to restore the connections, will create a result that still looks like a valid database 113. Therefore, success in unprotecting a database 113 that was permuted by the permutation-based data protection system 101 is indistinguishable from failure, since both successful and unsuccessful results look like valid databases 113. By contrast, successful attempts to decrypt ciphertext are obvious, because the resulting plaintext is human readable whereas the ciphertext is not.

The permutation-based data protection system 101 thus protects data by "hiding it in plain sight," leaving the contents of the datapoints (e.g., cells in a database 113 or a constituent data table) alone, but removing the connections among them through permutation. This is not only dramatically safer than encrypting the data, it is also in principle more computationally efficient, because performing a single permutation operation is less computationally intensive than executing commercial-grade encryption. However, because success in unprotecting a permuted database 113 is indistinguishable from failure, the data protected by the permutation-based data protection system 101 is in effect immune to even massive increases in the computing power available to hackers. As noted above, attempting every possible permutation from a column of n rows requires performing n! permutations. For a database with just 25 rows (which is several orders of magnitude smaller than a typical real-world deployment), any one of more than $10^{25}$ permutations for a single column could be the single correct one (for comparison, a trillion is $10^{12}$). This has already made the hacker's task more difficult than for a database with ten million rows protected by the longest encryption key that Amazon AWS uses. This level of security implies relative permanence compared to encryption-based strategies. More than skills and patience, it is the increasing computing power available to hackers that currently has so many businesses repeatedly spending so much money "upping their game" to try to stay one step ahead of the hackers. Those repeated, expensive efforts become unnecessary if the data is protected by the permutation-based data protection system 101 as described herein.

Referring to FIG. 1, the illustrated network architecture 100 comprises multiple clients 103A, 103B, and 103N (together may be referred to as "client 103") as well as multiple servers 105A and 105N (together may be referred to as "server 105"). In FIG. 1, the permutation-based data protection system 101 is illustrated as residing on the server 105A, a database management system 111 and corresponding database 113 are illustrated as residing on the server 105N, and a client agent 109 is illustrated as running on each client 103A-N. It is to be understood that this is an example only. In various implementations, various functionalities of the permutation-based data protection system 101 can be instantiated on a server 105, a client 103, or can be distributed among multiple servers 105 and/or clients 103. Additionally, although the database management system 111 is illustrated as residing on a single server 105B, it is to be understood that the database management system 111 and/or database 113 can be distributed across multiple computing and/or storage devices. As discussed in more detail below in conjunction with FIG. 3, in some implementations a database management system 111 is not utilized, but instead (or in addition) the permutation-based data protection system 101 operates in conjunction with data in file formats other than those of a database management system 111.

The clients 103 can be in the form of computing devices operated by users of the database management system 111 (or users who access other forms/types of data). A client agent 109 may be in the form of an application containing endpoint-level functionality for utilizing and/or interacting with the permutation-based data protection system 101 and/or the database system 101. In some implementations, client agents 109 are not utilized and the functionality of the permutation-based data protection system 101 and/or the database system 101 are accessed in other ways, e.g., via a browser (not illustrated).

Clients 103 and servers 105 can be implemented using computer systems 610 such as the one illustrated in FIG. 4 and described below. The clients 103 and servers 105 are communicatively coupled to a network 107, for example via a network interface 248 as described below in conjunction with FIG. 4. Clients 103 are able to access applications and/or data on servers 105 using, for example, a web browser or other client software such as a client agent 109. Clients 103 may be in the form of laptops, desktops and/or other types of computers/computing devices, including mobile computing devices, comprising portable computer systems capable of connecting to a network 107 and running applications (e.g., smartphones, tablet computers, wearable computing devices, etc.). Servers 105 can be in the form of, e.g., rack-mounted computing devices, located, e.g., in data centers.

Although FIG. 1 illustrates three clients 103 and two servers 105 as an example, in practice many more (or fewer) clients 103 and/or servers 105 can be deployed. In one implementation, the network 107 is in the form of the internet. Other networks 107 or network-based environments can be used in other implementations.

Figure 2:
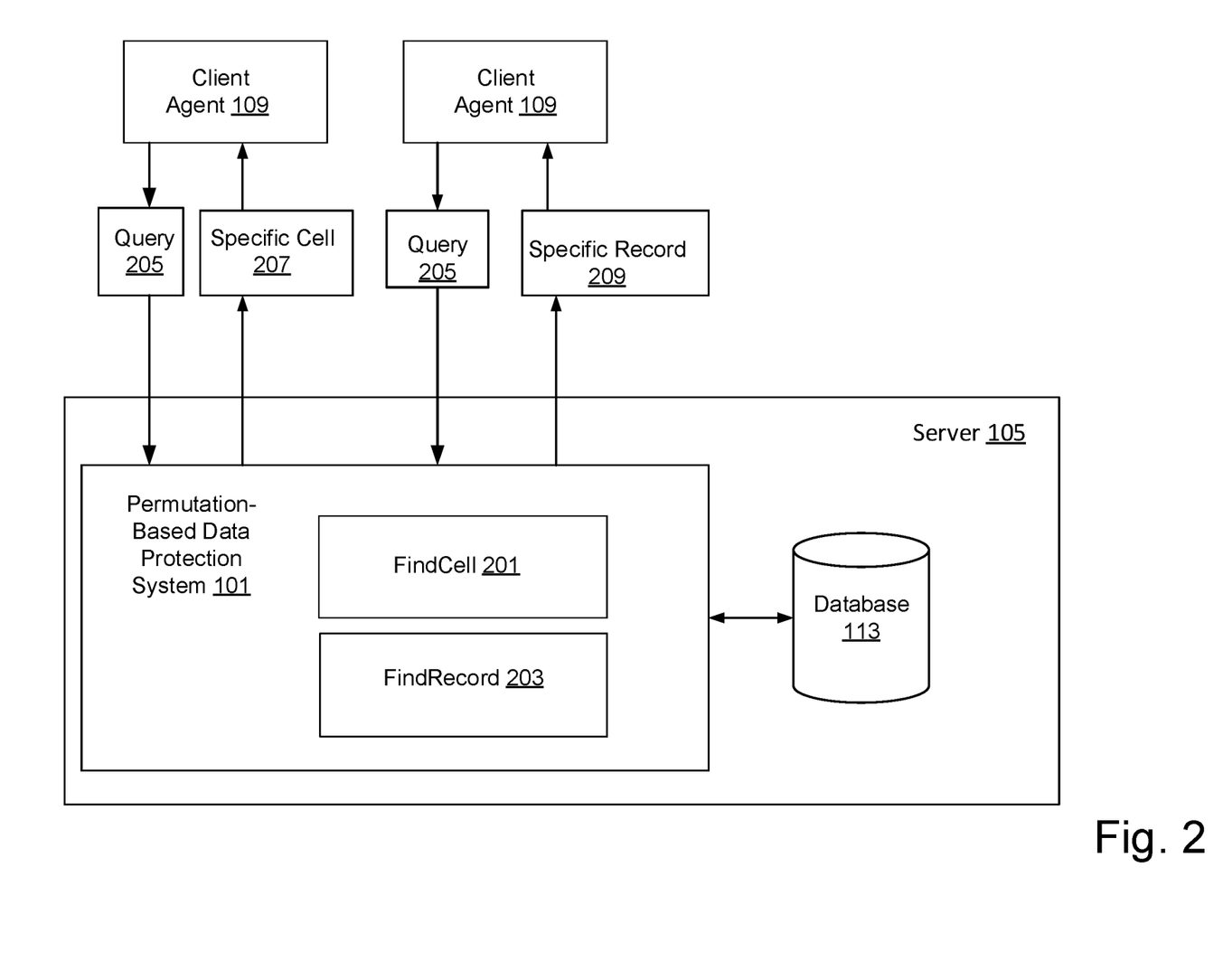
FIG. 2 is a block diagram of the operation of a permutation-based data protection system in the context of protecting a database, according to some implementations.

FIG. 2 illustrates the operation of a permutation-based data protection system 101, running on a server 105 and communicating with multiple client agents 109 according to some implementations. As described above, the functionalities of the permutation-based data protection system 101 can reside on a server 105 or other specific computer 610, or be otherwise distributed between multiple computer systems 610, including within a cloud-based computing environment in which the functionality of the permutation-based data protection system 101 is provided as a cloud-based service over a network 107. It is to be understood that although the permutation-based data protection system 101 is illustrated in FIG. 2 as a single entity, the permutation-based data protection system 101 represents a collection of functionalities, which can be instantiated as a single or as multiple modules, as desired. In some implementations, the different modules of the permutation-based data protection system 101 can reside on different computing devices 610 as desired. Each client agent 109 can be instantiated as an application configured to run under an operating system such as Windows, OS X, Linux, etc., or as an app for a given mobile operating system (e.g., Android, iOS, Windows 10, etc.), with different client agents 109 being specifically implemented for different types of operating environments utilized by different end users.

It is to be understood that the components and modules of the permutation-based data protection system 101 can be instantiated (for example as object code or executable images) within the system memory 617 (e.g., RAM, ROM, flash memory) of any computer system 610, such that when the processor 614 of the computer system 610 processes a module, the computer system 610 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the permutation-based data protection system 101 can be stored on computer-readable storage media. Any form of tangible computer-readable storage medium can be used in this context, such as magnetic, optical, flash and/or solid-state storage media, or any other type of media. As used herein, the term "computer-readable storage medium" does not mean an electrical signal separate from an underlying physical medium.

As illustrated in FIG. 2, in one implementation this "hiding in plain sight" is accomplished by permutation of the cells within a given column of a database 113. As described in greater detail below in conjunction with FIG. 3, in other implementations similar functionality is utilized in the context of files in other formats. In the database 113 instantiation of FIG. 2, the data in the cells of the permuted column still are of the same type and represent the same type of objects as prior to the permutation (e.g., date of first visit, social security number, etc.), but are in a different order that is no longer aligned with the other columns (i.e., the non-permuted columns, which are referred to herein as being in the clear). Therefore, once a given column is permuted, the cells of that column are no longer connected to the other columns in the given rows, which represent different datapoints all relating to a particular entry in the database 113, such as given patient, client, customer, supplier, cardholder, member, employee, etc. For example, if a database 113 stores records concerning patients of a hospital stored in rows, and the column of the database 113 in which patient's social security numbers are stored is permuted, the social security numbers for given patients are no longer located across the given rows of the database 113 pertaining to the given patients, and thus cannot be discerned by a malicious party that obtains access to the database 113.

It is to be understood that the permutation-based data protection system 101 may permute multiple columns, thus further hiding the relationship between units of within the database 113. As explained above, these permuted columns still contain the same type of content as in the unprotected database $113_{CLEAR}$ (for example, patient social security numbers or specific medical test results), except that the permuted columns do not per se contain any information that is either proprietary or highly confidential, since its relationship to specific patients is not discernible.

In order to permute the cells of a column, the permutation-based data protection system 101 applies a permutation algorithm using modular arithmetic. As described in more detail below, in different implementations the permutation-based data protection system 101 may apply different modular arithmetic based permutation algorithms to the column(s) to be protected, the different applied permutation algorithms having varying numbers and/or orders of parameters. More specifically, the permutation-based data protection system 101 may apply a bijective function using modular arithmetic, including, for example, modular subtraction and modular addition, in either order. A bijective function is a mathematical function between the elements of two sets, where each element of the first set is paired with exactly one element of the second set and vice versa, with no unpaired elements. In the case of the permutation-based data protection system 101 applies a bijective function from a set to itself, which is a permutation. What is meant in this context by a bijective function from a set to itself is from the set of the elements of a column in the clear to a permutation of the same set of the elements of the column permuted. Modular arithmetic is a system of integer arithmetic in which a number "wraps around" upon reaching a given value called the modulus, leaving a remainder. The quintessential example is the 12-hour clock in which 12 is the modulus. When the time exceeds 12, it wraps back around, and the remainder becomes the new time. For example, 9+5 on a 12-hour clock equals 2.

As noted above, the specific number of parameters to use in the bijective mathematical function applied to permute the cells of a column is a variable design choice. Using more parameters results in a higher level of security but requires more processing resources. Different parties will choose different balances between these factors in different scenarios as desired.

It is to be understood that the permutation of the cells of one or more columns in a database 113 (or other form of data table) transforms the database $113_{CLEAR}$ in the clear and columns in the clear that are to be permuted into a protected database $113_{PROTECTED}$ with one or more columns in which the cells have been permuted. Whereas the contents of a database $113_{CLEAR}$ in the clear can be readily understood by any party that accesses the database $113_{CLEAR}$, the contents of the permuted columns of a protected database $113_{PROTECTED}$ are meaningless to a party that is able to access the database $113_{PROTECTED}$, because the relationships between the cells of the permuted columns and the and associated database records is hidden, as described herein. This transformation of the database into secure content by the permutation-based data protection system 101 without the use of encryption is a great improvement to the field of computer security.

As one example, an instantiation is now discussed in which the owner of a confidential file is so concerned about security that performance cost is not an issue. It is to be understood that this is a theoretical scenario, and in practice actual examples will likely result in a tradeoff between security and processing cost. In any case, in this hypothetical example, a parameter-heavy procedure such as the following might be chosen for permuting the desired columns of a database 113 consisting of R rows and C columns. The database 113 in the clear can be thought of a rectangular array U (the unprotected array) of R rows and C columns. Assume in this example that column 0 will be left unpermuted (e.g., the unpermuted data in column 0 by itself carries no security risk). The remaining columns 1 through C−1 will be permuted. Thus, the protected array P will be created by the following steps. Create three two-dimensional arrays, S, FC and FR, each with R+1 rows and C−1 columns, and fill FC and FR initially with all zeroes, and fill each column of S with integers 0, 1, 2, . . . , R, going down the rows (so that, e.g., row 3 consists of all 3's). Now protect column c=1. Remove the leftmost column from S, into 1-dimensional array $T_c$, which will consist of $\{0, 1, 2, \ldots, R\}$. First, step cr for r=0, determine where to move the contents of cell r=0 in column c=1: Draw a random number $X_{rc}$ from set Z={0, 1, . . . , R−r}. Remove $X_{rc}$ from $T_c$, leaving the array with one less element (if, e.g., $X_{rc}$=4, then $T_c$ becomes {0, 1, 2, 3, 5, 6, . . . , R}). Now set $FC_{0c}$ equal to the $X_{rc}^{th}$ element of the set Z, $X_{rc}$ of FR=0, and put the contents of $U_{rc}$ into element $X_{rc}$ of P. Continuing down the column in this way puts each cell of U into a randomly chosen cell of the same column of P, random among cells of that column that are still empty. Each column of P further to the right is determined in the same way, with new randomizations.

It is to be understood that although randomization is used in parameter selection in the example instantiations described herein, any randomness used is just an incidental choice. For example, in a hypothetical instance in which parameters are not chosen randomly but instead deliberately, the chosen parameters might, e.g., never or almost never use numbers ending in 5 or 0 (because of, for example, some sort of preference to avoid them). In that case, if the rarity of parameters ending in 5 or 0 were somehow guessed by a hacker, the factorial issue would be slightly smaller. In the case of one million rows, the number of permutations might fall from 5.65 million digits to 2 million if 0 and 5 were never used, or to 5.2 million digits if they were occasionally used but disproportionately less often than 1-4 and 6-9. In other words, even without random parameter selection, the level of protection would still be very strong.

Two subroutines provided by the permutation-based data protection system 101 may be used to query the protected database $113_{PROTECTED}$ to obtain certain desired contents. These two subroutines are herein called FindCell 201 and FindRecord 203. In the example permutation described above, the array FC provides the R*(C−1) parameters of FindCell 201, and the identically dimensioned array FR provides the R*(C−1) parameters of FindRecord 203. The operation of FindCell 201 and FindRecord 203 are discussed in greater detail below.

The application of a different example algorithm by the permutation-based data protection system 101 is now described, near the other theoretical extreme in which performance cost is at a premium, so performance cost is reduced to a minimum by applying a one-parameter algorithm, at the expense of decreasing the robustness of the security provided. A specific example of an implementation in which the permutation-based data protection system 101 applies a one-parameter algorithm follows: again with N rows, draw a random integer A between, say, 11 and N−12. Now use modular arithmetic to place the datapoint that was in row r, column c in row r'=mod(r+c*A, N), still in column c. If a datapoint in row r, column c satisfies a query, and the corresponding datapoint in row 0 is needed, that datapoint is in row r=mod(r+N−c*A, N) of column 0 (the inverse of the prior function). Note, herein * denotes multiplication.

In the application of this example algorithm, the protected data table is filled via sets of projected fields, a mathematical term. By definition, two collections, A and B, each a partition of a given set S, form projected fields if any element of A intercepts every element of B, and any element of B intercepts every element of A. Thus, rows and columns are projected fields. Here, A could consist of elements each defined by a cell in the leftmost column and the cells in each other column obtained by applying the mod(r+c*A, N) formula, and B could consist of the collection of columns of the data table. Projected fields can be used in this context in other instantiations of permutation algorithms with other numbers of parameters as desired.

An example of the permutation-based data protection system 101 applying a two-parameter algorithm is now provided, with parameters (x, y): Protect any column c in the unprotected database 113 by performing the following steps: if c is odd, place the datapoint in row r into row r=mod(r+x, N), if c is even, place the datapoint in row r into row r=mod(r+y, N). The inverse function is obtained by modular subtraction, just as in the previous example.

In other examples, other numbers of parameters may be used as desired. In a four-parameter example with C columns, draw a random integer D from [0.25 C, 0.6 C]. Having drawn D, draw a random integer D from [D+1, 0.9 C]. Use the random integer A as in the one-parameter example for columns to the left of D, and a separately randomized B in the same formula for columns D and further rightward but to the left of D̲. Use a separately randomized G in the same formula for columns D̲ and further rightward.

In a three-parameter example with C columns, draw a random integer D from [0.3 C, 0.8 C]. As in the 2-parameter example, for columns to the left of D, if c is odd, place the datapoint in row r into row r̲=mod(r+x, N), if c is even, place the datapoint in row r into row r̲=mod(r+y, N). For column D and columns further right, use the same formulas, but with y if c is odd, and with x if c is even.

As noted above, the specific number of parameters to use in the bijective function used to permute specific columns of the database 113 is a variable design choice, with more parameters providing greater security but using more processing power. It is to be further understood that the specific modular arithmetic operations to apply and the order in which to apply them can vary between implementations. Additionally, how many and which columns of the database 113 to permute is variable, and is based on which fields of the database 113 contain sensitive information to be dissociated from the associated records.

Thus, as described above, the permutation is controlled by the application of an algorithm that implements one of a class of mathematical functions. This might appropriately be described as a random permutation in two senses: [a] a bad actor obtaining the protected database 113, but neither the algorithm nor the parameters of the function, observes permutations of all or most columns of the data table that cannot be distinguished from random; [b] in practice it is possible (although not necessary) to have the parameters (of the particular function being used for disconnecting the cells) themselves be selected randomly, making the permutations that result random. It is to be understood that once the database $113_{PERMUTED}$ has been permuted, the unpermuted database $113_{CLEAR}$ need not be retained because the desired data can be queried and accessed therefrom as described below. It is however possible, where desired, to maintain a copy of the unpermuted database $113_{CLEAR}$ in a location where is not accessible to hackers, for example offline.

Obtaining desired content from the permuted database 113 is now described, according to some implementations. Using the functionalities described herein, queries to the permuted database can be processed and the requested data obtained without having to unprotect the database $113_{PERMUTED}$, or unprotect any or each specific column that might be involved in satisfying the query. Because the data itself is not altered but only permuted when the database $113_{PERMUTED}$ is protected, the data is still present in the protected database $113_{PERMUTED}$ and is thus available for processing queries; the data just is not in the same place as it would be in an unprotected database $113_{CLEAR}$. So, there are small performance costs associated with locating and obtaining particular data in the permuted database $113_{PERMUTED}$ as opposed to a protected version thereof. However, the performance overhead is minimal compared to decryption. More specifically, to retrieve data to be transmitted in the response to a query, an extra step of modular arithmetic is utilized to find the right row in a queried column. Such modular arithmetic steps, summed over all aspects of handling a query, entail a significantly smaller performance cost than decrypting an encrypted database $113_{ENCRYPTED}$, whether that decryption is of the entire database $113_{ENCRYPTED}$, or is to be done separately for each field (that is, when "structure-preserving encryption" is in use). Note that the querying of a permuted database $113_{PERMUTED}$ does not entail un-permuting the permuted database as a whole, or any whole permuted column thereof.

The transmission to the querying computer (e.g., a client 103 interacting with the database management system 111) after the data to respond to a query has been found may be protected by essentially the same logic described above. For example, suppose a query for specific data for a particular supplier results in one record which comprises eight fields. A ratio of extraneous to actual data may then be employed to protect the data transmission. The ratio to use is a variable design feature, and may be chosen by, e.g., the database licensee, a database administrator, the publisher of the permutation-based data protection system 101, etc. In an example scenario in which that ratio is 4 to 1, four records of extraneous (or outright fictitious) data are gathered, with each of these four records comprising the same number and types of fields as the actual record (e.g., eight fields per record in this example). Now the same permutation algorithm, using time-sensitive parameters, may be applied to the resulting grid of five records, each consisting of eight fields. Thus, the single record containing the response to the query is permuted with four extraneous records. Once permuted, this five-record grid is sent to the querying computer. Because the actual result of the query is permuted with four other records, the transmission is protected. The querying computer is then able to use the same parameters to unprotect the five records, via the inverse modular arithmetic, and select the one requested record, which may then be displayed on the requester's device or otherwise used as desired.

In some implementations, protecting or unprotecting any type of file that either is ordinarily in a rectangular structure (e.g., a data table of a database 113), or has been fit into a rectangular structure (e.g., by treating each byte of a file as if it were a single datum in a database 113 as described below in conjunction with FIG. 3) may be accomplished via repeated usage of two basic subroutines. Finding data, altering, adding, and removing data, may all rely on the same two subroutines. The subroutines will deliver results dependent on the various parameters used in the corresponding applied permutation algorithm as described above, which will typically be situation specific. These two subroutines are referred to herein as FindCell 201 and FindRecord 203, but it is to be understood that the naming is not significant, and in other implementations the subroutines may have different names (and/or more or different subroutines may be used).

The FindCell 201 subroutine locates a specific cell associated with a specific record in a permuted field. Because the field is permuted, the specific cell is not located within the specific record to which it is associated. In an implementation in which fields are stored in columns and records in rows, FindCell 201 locates a specific cell in a permuted column that is associated with a given row, but not located in that row because of the permutation. More specifically, FindCell 201 performs a modular arithmetic operation applying the one or more parameters used in the application of the permutation algorithm, an identifier of the specific record with which the specific cell of the permuted field is located, and an identifier of the specific permuted field to locate the specific cell in the permuted field.

The rectangular structure (e.g., database or other file type) will (usually, but not necessarily) have a "primary field." In some implementations this will be the leftmost column (in an instantiation in which fields are stored in columns). The FindCell 201 subroutine takes as inputs an array of the parameter(s) that were used to permute the database 113 (which in different implementations will be of different constituents), a row number in the primary column (or other form of identifier of the record with which the specific cell of the permuted field is associated), and a desired column, expressed as, e.g., a column number or as a column header (or another form of identifier of the desired field). The FindCell 201 subroutine applies the parameter(s) and makes one modular arithmetic operation to output the corresponding row in the desired column. For example, suppose last month's quantities shipped to various customers are in the "Qm−1" column, and that datum is requested for customer 1234, where 1234 appears in row 567 of the primary column. Then the FindCell 201 subroutine takes the relevant parameter(s), suppose it is 8910 in a one parameter example, and adds 567+8910=9477 and outputs 9477, the desired row in the "Qm−1" column where this customer's shipments last month are found. If the rectangular structure only has, say, 7000 rows, then the desired row is 9477−7000=2477, automatically found by adding modulo 7000.

The FindRecord 203 subroutine locates a specific record with which a specific cell in a permuted field is associated. Because the field is permuted, the specific cell is not located within the specific record with which it is associated. In an implementation in which fields are stored in columns and records in rows, FindRecord 203 locates a row that is associated with a specific cell of a permuted column, where the specific cell is associated with the specific row, but not located therein because of the permutation. More specifically, FindRecord 203 performs a modular arithmetic operation applying the one or more parameters used in the application of the permutation algorithm, an identification of the specific record within which the specific cell of the permuted field is located but with which it is not associated, and an identification of the specific permuted field to locate the specific record with which the permuted field is associated.

Suppose the data requested are the customer numbers, and their distances from the shipping plant location, for all customers to whom between 100 and 200 units were shipped last month. Further suppose the contents of the cell in row 9477 of the "Qm−1" column falls in that range. In this type of scenario, the FindRecord 203 subroutine is used, which is essentially the inverse of the FindCell 201 subroutine. FindRecord 203 takes as inputs the same array of parameter(s), the "Qm−1" column, and the row 9477 in which the quantity shipped that fit the range was found. In our one parameter example, FindRecord 203 takes the same parameter, subtracts 9477−8910, and outputs 567, which is the row in the primary column where this customer's customer number, 1234, is found. As the distance shipped is, for this example, not considered confidential information so long as the customer is not identified, that datum will be in row 9477 of the "distance" column, indicated by the parameter for that column matching the parameter for the "Qm−1" column.

The most frequent usage of nearly any database 113 is to query it for information. Using the permutation-based data protection system 101 as described above, queries can be handled without having to unprotect the database 113, whereas in conventional encryption based systems, an encrypted database 113 has to be unencrypted to be queried. Not having to decrypt an encrypted database 113 into an unprotected form that can be queried results in a considerable savings in performance cost. Typically less frequent than querying a database 113, but still a regular supported occurrence, is updating the contents of an existing record (i.e., updating one or more specific fields of a given record to indicate information such as that a given party did or did not renew a subscription, that a given customer paid a specific amount on his account, etc.).

While it is comparatively rare, another supported database operation is adding a new record, which is performed, for example, when a new customer opens an account at a bank. Deleting an existing record is another comparatively rare supported operation, performed for example when a patient decides to take her business to a different doctor outside a given practice, and asks that her information be deleted after being provided to the new doctor. It is also possible that the existing schema of a database 113 will be edited, by adding one or more new fields, for example when a new product is brought to market, a new franchisee added, etc. In some implementations, support for these additions and deletions to an existing database 113 in the context of the permutation-based data protection system 101 is handled when the database 113 is initially permuted.

More specifically, before permutation multiple additional fields can be added to the database 113, one for system usage as described below, and others to allow for the addition of new fields later on without having to un-permute the database 113 and then re-permute it. Any data can initially be stored in the fields introduced for future use. In one implementation, data replicating or mimicking existing fields can be stored therein to make interpretation by an unauthorized party more difficult. The specific number of fields to add for future use is a variable design choice. In addition, before the initial permutation, a number of unused records can also be added to the database, in order to support adding new records later without having to un-permute and re-permute the database 113 each time a record is added. As with unused fields, the number of unused records to add and the contents to store therein are variable design choices, but existing records may be replicated in unused records for added security. The new field for system usage mentioned above may be used to encode whether a record contains real data or is simply a placeholder to add a new record. The placeholder records are permuted along with the actual data records of the database 113, all of which contain placeholder fields.

When a new record is added, the actual data for that record replaces the fictitious placeholder data in a placeholder record, and the coded cell indicating fictitious data is switched to a coding indicating real data. The reverse operation is done when a real record is removed (that is, real data is replaced by fictitious data and the encoding field is updated accordingly). As with any other record, a placeholder record being found to replace with a new record in an add operation, or a real record being found to be replaced with fictious data in a delete operation, is located using modular arithmetic as described above, because the record is permuted, and thus not stored straight across a row in the database 113.

Figure 3:
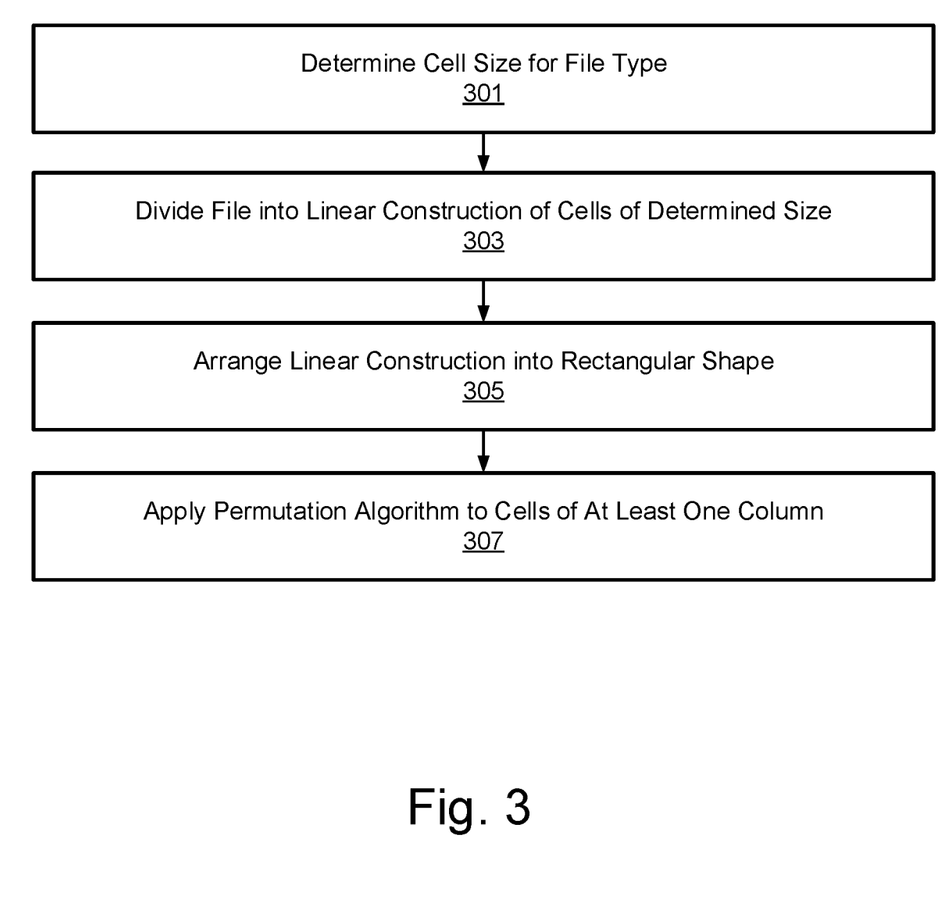
FIG. 3 is a flowchart illustrating steps of the operation of a permutation-based data protection system in the context of protecting files in non-database formats, according to some implementations.

As illustrated in FIG. 3, in some implementations the permutation-based data protection system 101 may be utilized to protect files in formats other than that of a database 113. In such implementations an arbitrary file of an arbitrary type that contains proprietary or confidential information can also be protected by applying the corresponding functionality described herein. This functionality can be used to protect a document file, a text file or any other file containing alphanumeric content (e.g., words, abbreviations, whitespace, numbers, etc.), an image file, a sound file, an animation, movie or other form of video file, any such file type in any one of the various formats widely or less widely used (e.g., .docx, .txt, .html. .xls, .pdf, .gif, .jpg, .mp3, .alac, .wav, .flac, .mp4, .mov, .avi, etc.). Additionally, any file that can be represented as a header followed by a series of binary and/or hexadecimal numbers (essentially, any file type whatsoever) can be protected by the application of the functionality described herein. Note that unlike in the above-described example implementations protecting databases 113, with protected files in other formats success in unprotecting would be visibly discernible to a hacker because all unsuccessful attempts to un-permute the data would yield gibberish, whereas a successful attempt using the correct parameters would result in content that looks like a file of a particular type. Nonetheless, despite the absence of this one particular advantage, the resulting protection is still extremely strong compared to encryption, and the computational overhead is still lower.

To permute a file of any type, the permutation-based data protection system 101 may determine 301 a "cell size" for a particular file of a given type. The cell size could be, for example: one character in a document, one letter, number, punctuation mark, space, or end-of-paragraph indicator; one hexadecimal character; one byte; one group of n successive bytes; one n by n grid of pixels; 0.2 seconds worth of sound or of animation; or other specification of size. The permutation-based data protection system 101 may divide 303 the file into a linear construction of cells, each cell sized as determined in step 301. The permutation-based data protection system 101 may then arrange 305 the linear construction into a rectangular shape, first filling across the top row, then across the next row, and so on for all of the data in the file. The permutation-based data protection system 101 may then protect this structure by removing connections between adjacent cells within a row, by applying 307 a particular bijective mathematical function to permute the cells within a given column, for all, nearly all, or a given subset of columns as desired. It is to be understood that although organization of the non-database file into column-based fields and row-based records is described, in other implementations row-based fields and column-based records can be used. In either case, the FindCell 201 and FindRecord 203 subroutines can be used in the context of non-database file types, as described above in the context of database implementations.

A particular example of improved security through the use of the permutation-based data protection system 101 for protecting one of the most frequent types of data transmissions is now described: a digital transaction in which a credit card number is transmitted for purposes of authorization. More specifically, when a purchaser engages in a credit card transaction, the credit card number, other identifying information concerning the card holder (e.g., the purchaser's name, the three digit card verification value (CVV), the expiration date), and information concerning the transaction is sent to the card issuer or a third party authentication service, which authorizes or declines the transaction. Conventionally, the credit card number and the CVV in such transmissions are simply hashed, which is not terribly secure because access to a plurality of hashed credit card numbers can be used to determine the hashing algorithm being used (after all, credits cards contain only 16 decimal digits, and CVVs are only three digits), and access the actual information.

The permutation-based data protection system 101 system described herein can attain much greater security by treating the information to be transmitted for authorization as a record, adding extraneous records to the data, and permuting the actual record of interest with the extraneous records. As a simple example, suppose the format of the data to be transmitted for credit card authentication comprises a name, a dollar-and-cents amount, a 16-digit card number, a CVV code, and perhaps a card expiry month/year (actual formats can vary). Using the example ratio of 4 to 1, four extraneous records having the same format are added to the actual record containing the information concerning the transaction to be authorized, and each field of the five total records may be permuted. The added performance-cost would be quite small, as not a lot of data is transmitted for a credit card authorization, even with the addition of the extraneous records. However, it would far more difficult for a hacker or other malicious party who manages to intercept the transaction to unprotect the data and access the buyer's credit card information. The authentication service could then un-permute the received data as described above.

The approach described herein for protecting both databases 113 and files of other types achieves a very robust level of protection against compromise. The difficulty for a hacker to unprotect a database or file permuted as described herein is of vastly greater magnitude than with encryption, even when the encryption key is quite long. A hacking task is exponential in the length of the encryption key. Larger files give more clues to narrow down possible encryption keys. An unprotecting task for functionality described herein is factorial in the number of rows in the rectangular representation of an arbitrary file type. If there are as few as 25 rows, then for a single column, any one of more than $10^{25}$ permutations could be the single correct one (for comparison, a trillion is $10^{12}$). This has already made the hacker's task more difficult than for a database 113 with ten million rows protected by the longest encryption key that Amazon AWS uses. At 50 rows (likely still a very small file), there are over $10^{64}$ permutations, at 100 rows, over $10^{157}$. This method of protection applied to a modest-size database 113, a large image at high resolution, or a video clip of a few minutes, could easily run to one million rows, for which there are over $8.26*10^{5,565,708}$ permutations (this is approximately {the estimated number of hydrogen atoms in the universe}$^{50,000}$ and appears to be the largest integer ever calculated for a purpose other than abstract number theory). This level of security is unapproachable using encryption, and hence the application of the permutation-based functionality described herein to secure content stored in databases 113 and/or files in other formats against unauthorized access by malicious parties represents a major improvement in the field of computer security, as well as an improvement in the operation of server farms, data centers, and the secure storage technology generally.

Figure 4:
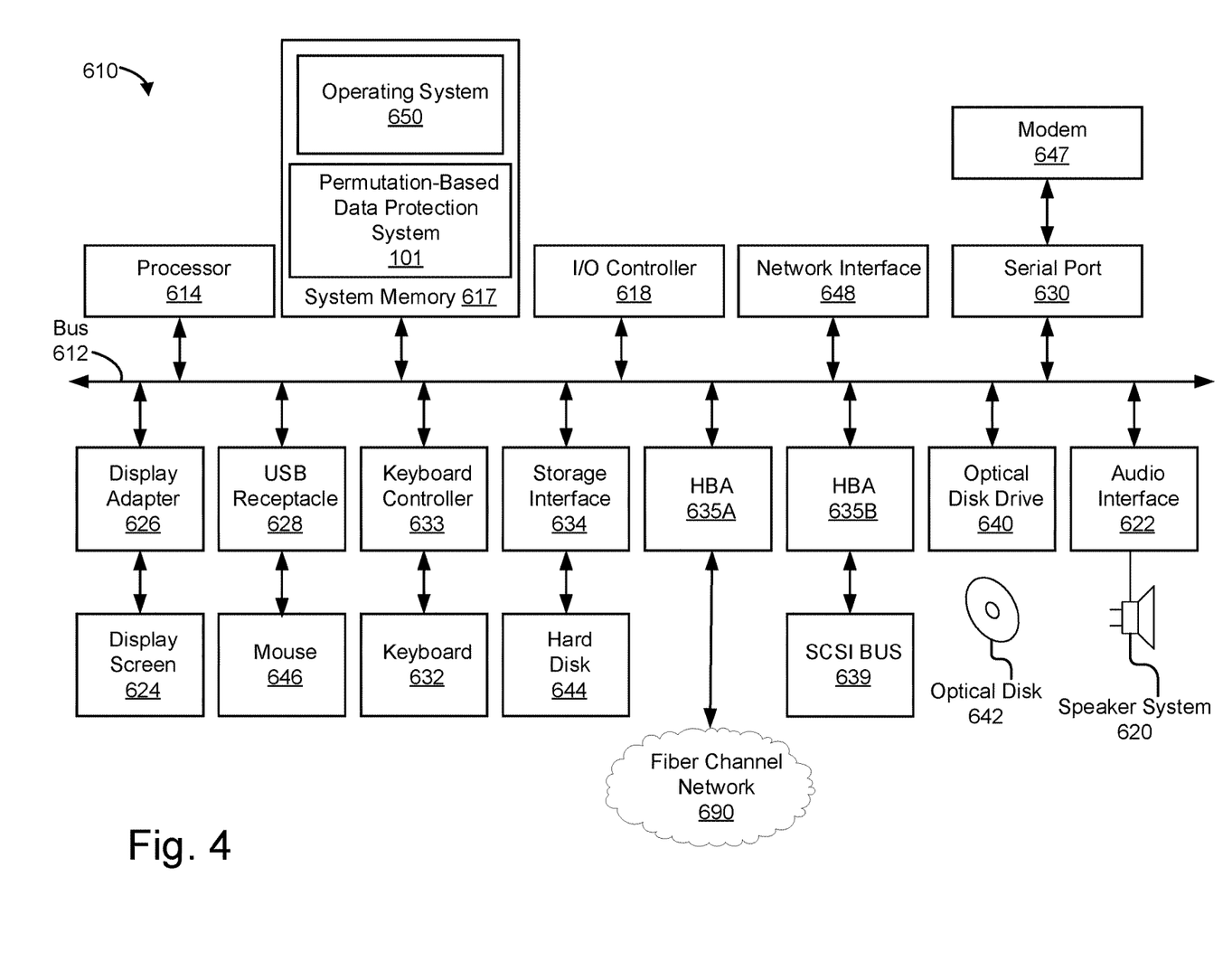
FIG. 4 is a block diagram of a computer system suitable for implementing a permutation-based data protection system, according to some implementations.

FIG. 4 is a block diagram of an example computer system 610 suitable for implementing a permutation-based data protection system 101. Both clients 103 and servers 105 can be implemented in the form of such computer systems 610. As illustrated, one component of the computer system 610 is a bus 612. The bus 612 communicatively couples other components of the computer system 610, such as at least one processor 614, system memory 617 (e.g., random access memory (RAM), read-only memory (ROM), flash memory), an input/output (I/O) controller 618, an audio output interface 622 communicatively coupled to an audio output device such as a speaker 620, a display adapter 626 communicatively coupled to a video output device such as a display screen 624, one or more interfaces such as Universal Serial Bus (USB) receptacles 628, serial ports 630, parallel ports (not illustrated), etc., a keyboard controller 633 communicatively coupled to a keyboard 632, a storage interface 634 communicatively coupled to one or more hard disk(s) 644 (or other form(s) of storage media), a host bus adapter (HBA) interface card 635A configured to connect with a Fibre Channel (FC) network 690, an HBA interface card 635B configured to connect to a SCSI bus 639, an optical disk drive 640 configured to receive an optical disk 642, a mouse 646 (or other pointing device) coupled to the bus 612, e.g., via a USB receptacle 628, a modem 647 coupled to bus 612, e.g., via a serial port 630, and one or more wired and/or wireless network interface(s) 648 coupled, e.g., directly to bus 612.

Other components (not illustrated) may be connected in a similar manner (e.g., document scanners, digital cameras, printers, etc.). Conversely, all of the components illustrated in FIG. 4 need not be present (e.g., smartphones and tablets typically do not have optical disk drives 640, external keyboards 632 or external pointing devices 646, although various external components can be coupled to mobile computing devices via, e.g., USB receptacles 628). The various components can be interconnected in different ways from that shown in FIG. 4.

The bus 612 allows data communication between the processor 614 and system memory 617, which, as noted above may include ROM and/or flash memory as well as RAM. The RAM is typically the main memory into which the operating system 650 and application programs are loaded. The ROM and/or flash memory can contain, among other code, the Basic Input-Output system (BIOS) which controls certain basic hardware operations. Application programs can be stored on a local computer readable medium (e.g., hard disk 644, optical disk 642) and loaded into system memory 617 and executed by the processor 614. Application programs can also be loaded into system memory 617 from a remote location (i.e., a remotely located computer system 610), for example via the network interface 648 or modem 647. In FIG. 4, the permutation-based data protection system 101 is illustrated as residing in system memory 617, but in some embodiments, some parts of system 101 may be located elsewhere, e.g., on a hard disk 644 or other storage mechanism.

The storage interface 634 is coupled to one or more hard disks 644 (and/or other standard storage media). The hard disk(s) 644 may be a part of computer system 610 or may be physically separate and accessed through other interface systems.

The network interface 648 and/or modem 647 can be directly or indirectly communicatively coupled to a network 107 such as the internet. Such coupling can be wired or wireless.

As will be understood by those familiar with the art, the subject matter described herein may be embodied in other specific forms without departing from the spirit or integral characteristics thereof. Likewise, the particular naming and division of the portions, modules, agents, managers, components, functions, procedures, actions, layers, features, attributes, methodologies, data structures and other aspects are not mandatory or significant, and the entities used that implement the subject matter described herein may have different names, divisions and/or formats. The foregoing description, for purpose of explanation, has been described with reference to specific implementations. However, the illustrative discussions above are not intended to be exhaustive or limiting to the precise forms disclosed. Many modifications and variations are possible in view of the above teachings. The implementations were chosen and described in order to best explain relevant principles and their practical applications, to thereby enable others skilled in the art to best utilize various implementations with or without various modifications as may be suited to the particular use contemplated.

In some instances, various implementations may be presented herein in terms of algorithms and symbolic representations of operations on data bytes within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "configuring," "determining," "displaying," or the like, refer to the action and processes of a computer system, or similar electronic device, that manipulates and transforms data represented as physical (electronic) quantities within the computer system's registers and memories into other data similarly represented as physical quantities within the computer system memories or registers or other such information storage, transmission or display devices.

Finally, the structure, algorithms, and/or interfaces presented herein are not inherently tied to any particular computer or other apparatus. Various general-purpose systems may be used with programs in accordance with the teachings herein, or it may prove convenient to construct more specialized apparatus to perform the method blocks. The structure for a variety of these systems will appear from the description above. In addition, the specification is not described with reference to any particular programming language. It will be appreciated that a variety of programming languages may be used to implement the teachings of the specification as described herein.

Accordingly, the disclosure is intended to be illustrative, but not limiting.

What is claimed is:

1. A method of securing content designated for transmission from a first computing device to a second computing device from unauthorized access, by hiding relationships between units of content, the method comprising:
 obtaining, by the first computing device, a data record designated for transmission to a second computing device, the data record comprising multiple fields;
 obtaining a specific number of additional data records of the same type as the data record designated for transmission, the additional records containing data that is not responsive to a query that returned the record designated for transmission;
 treating the record designated for transmission and the additional records as a data grid comprising multiple records, each record of the data grid comprising multiple fields;
 transforming the data grid into a protected data grid by permuting cells of at least one field of the data grid;
 wherein permuting cells of at least one field of the data grid further comprises applying a permutation algorithm using modular arithmetic to the cells of the at least one field, wherein the permutation reorders the cells of the data grid across multiple records, without altering content of any individual cell;

transmitting the permuted data grid to the second computing device;

wherein the at least one permuted field still contains all of the original cells in a permuted order, thereby hiding relationships between the cells of the permuted field and other cells of the data grid; and wherein the transformed, protected data grid secures sensitive content from unauthorized access by hiding relationships between the sensitive content and other fields of associated data grid records.

2. The method of claim 1 wherein applying a permutation algorithm using modular arithmetic further comprises:

applying a bijective function using modular arithmetic to permute the cells of the specific field of the data grid.

3. The method of claim 1 wherein applying a permutation algorithm using modular arithmetic further comprises:

applying a permutation algorithm using modular addition and modular subtraction, in either order.

4. The method of claim 1 wherein the data record designated for transmission to a second computing device further comprises:

a credit card number and associated data designated for transmission to authenticate a credit card transaction.

* * * * *